UNITED STATES PATENT OFFICE.

WILLIAM H. SPENCER, OF BROOKLYN, NEW YORK.

IMPROVEMENT IN HEATING-RETORTS FOR THE MANUFACTURE OF ILLUMINATING-GAS.

Specification forming part of Letters Patent No. 166,037, dated July 27, 1875; application filed December 28, 1874.

*To all whom it may concern:*

Be it known that I, WILLIAM H. SPENCER, of Brooklyn, in the State of New York, have invented an Improvement in the Manufacture of Illuminating-Gas, of which the following is a specification:

In the decomposition of petroleum for the production of illuminating-gas — whether crude or in the shape of a distillate—it has been found advantageous to first vaporize the material, to the end that it may be supplied to the retort in a less concentrated, and therefore better regulated, quantity, not requiring so nice an adjustment to the necessarily-varying temperature of the retort; and, moreover, it is advantageous in that to a certain extent it separates the widely-different constituents of the material into certain groups having more or less homogeneity or similarity of composition and gravity.

In practice it is customary to subject the oil to two distinct conditions of temperature—the first designed to effect vaporization alone, the second or higher degree being employed for the transformation of the vapors so produced into a permanent gaseous form; and hitherto it has been practically inexpedient to admit liquid oil or naphtha into a decomposing-retort, for the reasons that the fluctuating temperature of the retort and the inconstant gravity and composition of the oil have rendered it practically impossible to maintain between the two the exact relation favorable to thorough and economical decomposition. The temperature and feed, which at one time proves satisfactory, from time to time becomes disproportionate through the above-mentioned causes, and results in the deposition of carbon in its solid form, or the escape of vapors, undecomposed and condensable.

The object of the following improvement is twofold — first, to render one of the ever-varying conditions — that of temperature—constant, so that the retort shall at all times when in use be subjected to an unvarying degree of heat, sufficient to produce permanent decomposition of a certain regulated quantity of liquid hydrocarbon introduced therein; second, to admit of the use of iron or metallic retorts without liability of being either melted by injudicious and excessive firing, or to external oxidization by contact with the furnace-gases, the importance of which is manifest in the fragility and porosity of fire-clay, and their absolute dependence on an exhauster or equivalent device for successful and economical working.

I make use of a retort that is heated by the action of vapors generated in the distillation of zinc or other volatile metal, whereby a nearly uniform temperature will be maintained for the decomposition of liquid hydrocarbon in the retort, because such metal volatilizes at a definite and regular temperature, and the liquid will be supplied into the retort in proportion, so that the gas will be made at a nearly uniform temperature. The retort will not be injured by overheating, and the melted metal will not come into contact therewith.

In the use of zinc as the heat-conveying medium, I remark that the manufacture of illuminating-gas and the purifying of the zinc may be conducted simultaneously, because the crude zinc or ore may be distilled, and the retort be contiguous thereto, and the vapors be received into a separate chamber and condensed, and subsequently melted for use; or the metal may be used over again in the gas-making apparatus.

I do not claim distilling oils and other materials in a retort immersed in melted metal, as that has been employed; but it is subject to considerable variations in temperature.

My improvement renders the temperature nearly uniform, as it is well known that where an escape is given to the vapors that distill from zinc or other metal, such as cadmium, the temperature of the vapors passing off will be uniform, or nearly so, regardless of the temperature of the mass.

I claim as my invention—

The method herein described of heating a retort for the manufacture of illuminating-gas by the vapors generated in the distillation of zinc or other metal, as set forth.

Signed by me this 22d day of December, A. D. 1874.

WM. H. SPENCER.

Witnesses:
GEO. T. PINCKNEY,
CHAS. H. SMITH.